(12) United States Patent
Tang et al.

(10) Patent No.: US 7,499,962 B2
(45) Date of Patent: Mar. 3, 2009

(54) ENHANCED FUSED MULTIPLY-ADD OPERATION

(75) Inventors: Ping T. Tang, Castro Valley, CA (US); David D. Donofrio, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 11/019,921

(22) Filed: Dec. 21, 2004

(65) Prior Publication Data
US 2006/0136540 A1 Jun. 22, 2006

(51) Int. Cl.
*G06F 7/483* (2006.01)
(52) U.S. Cl. ...................................... 708/501
(58) Field of Classification Search .................. 708/501
See application file for complete search history.

(56) References Cited

U.S. PATENT DOCUMENTS

| 6,078,939 | A | | 6/2000 | Story et al. | |
|---|---|---|---|---|---|
| 6,141,670 | A | * | 10/2000 | Story et al. | 708/276 |
| 6,792,443 | B2 | | 9/2004 | Tang | |
| 2002/0194240 | A1 | * | 12/2002 | Pangal et al. | 708/501 |
| 2003/0018676 | A1 | * | 1/2003 | Shaw | 708/501 |
| 2004/0186873 | A1 | | 9/2004 | Tang et al. | |
| 2006/0149803 | A1 | * | 7/2006 | Siu et al. | 708/501 |

* cited by examiner

*Primary Examiner*—David H Malzahn
(74) *Attorney, Agent, or Firm*—Thomas R. Lane

(57) ABSTRACT

An apparatus, method, and system for performing an enhanced fused multiply-add operation is disclosed. In one embodiment, an apparatus includes an exponent unit. The exponent unit includes a first adder to generate S1, where S1 is the sum of an integer k, the exponent of a floating point value A, and the exponent of a floating point value B. The exponent unit also includes a comparator to generate E1, where E1 is the greater of S1 and the exponent of a floating point value C. The apparatus also includes a partial multiplier, a shifter, and a second adder. The partial multiplier generates the partial products of the mantissas of A and B. The shifter aligns the partial products and the mantissa of C, based on E1. The second adder adds the aligned partial products and the mantissa of C. The apparatus is able to generate not only (A*B+C), but is enhanced to also be able to generate ($2^k$*A*B+C) and the closest integer to ($2^k$*A*B) in two's complement or floating point format.

13 Claims, 4 Drawing Sheets

ENHANCED FUSED MULTIPLY-ADD OPERATION

BACKGROUND

1. Field

The present disclosure pertains to the field of data processing apparatuses and, more specifically, to the field of floating point arithmetic in data processing apparatuses.

2. Description of Related Art

A single instruction, the fused multiply-add instruction, has been used to support the four basic floating point arithmetic operations of addition, subtraction, and multiplication. Generally, this instruction takes three floating point inputs, A, B, and C, and returns A*B+C. To perform the operation of X+Y, A can be set to one, B can be set to X, and C can be set to Y. To perform the operation of X−Y, A can be set to one, B can be set to X, and C can be set to negative Y. To perform X*Y, A and B can be set to X and Y, respectively, and C can be set to zero.

Additionally, the fused multiply-add instruction takes advantage of the structure of a typical basic multiplier to perform a multiply-add operation, often used in graphics processing, with one instruction instead of two, without significantly increasing the latency of the typical basic multiplier. Specifically, the typical basic multiplier includes summation logic to add the partial products of the multiplication of A and B, so C can be simply treated as one additional partial product.

BRIEF DESCRIPTION OF THE FIGURES

The present invention is illustrated by way of example and not limitation in the following figures.

DETAILED DESCRIPTION

The following description describes embodiments of an enhanced fused multiply-add operation. In the following description, numerous specific details, such as hardware configurations and data formats, are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide an enhanced fused multiply-add ("EMAD") instruction. In one embodiment, the EMAD instruction may be used to perform scaling, such as multiplying a floating point number by $2^k$, where k is an integer. In another embodiment, the EMAD instruction may be used to provide the closest integer value of floating point number. Among other applications, both of these operations may be used in calculating the results of elementary transcendental functions typical in graphics processing. The EMAD instruction may be used to advantageously reduce the number of instructions that are executed to calculate these results.

Figure 1:
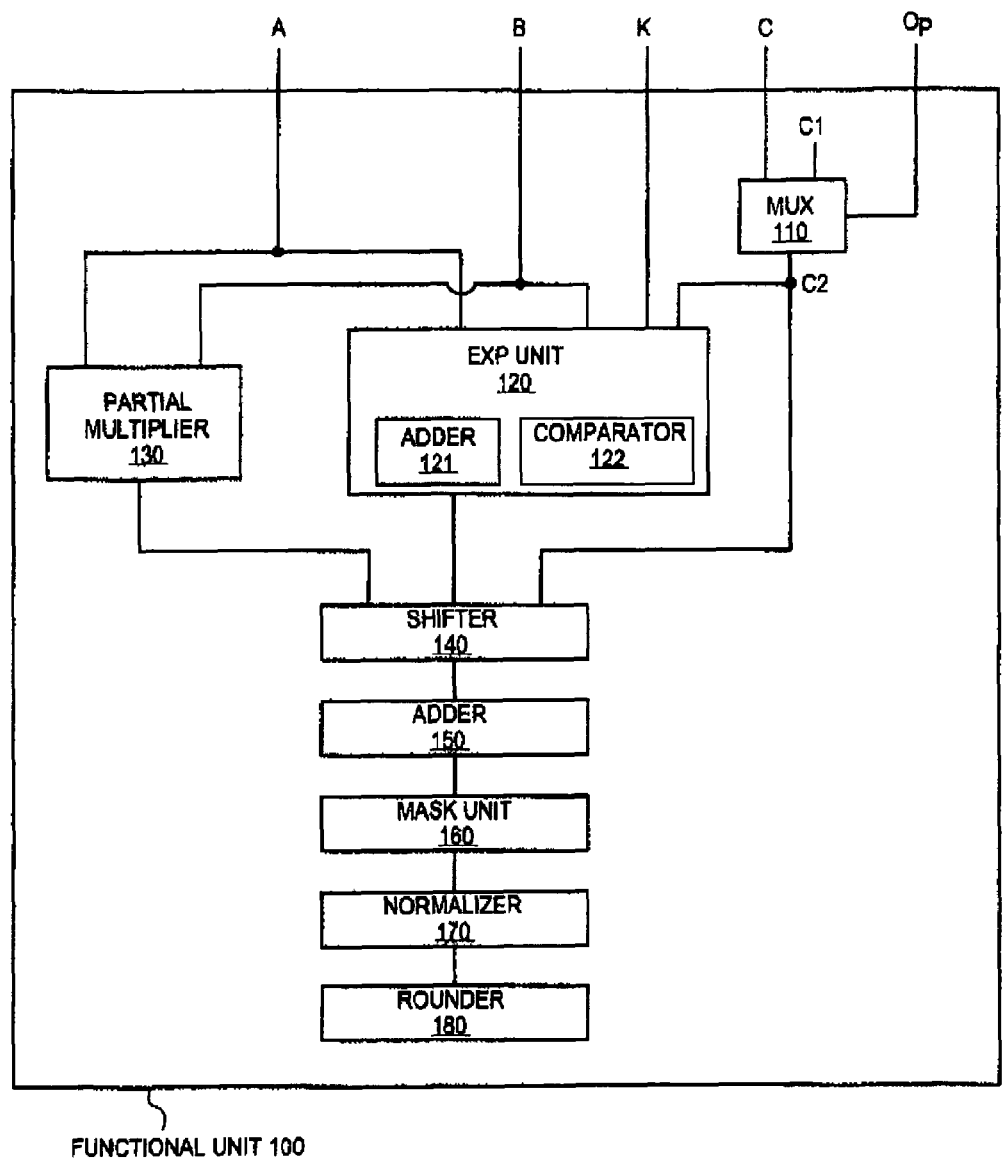
FIG. 1 illustrates an embodiment of a functional unit for performing an enhanced fused multiply-add operation.

FIG. 1 illustrates an embodiment of a functional unit 100 for executing an EMAD instruction. In this embodiment, binary arithmetic is used. Functional unit 100 includes multiplexer 110, exponent unit 120, partial multiplier 130, shifter 140, adder 150, mask unit 160, normalizer 170, and rounder 180. Each of these units may be implemented with any known logic, circuit, structure, or other approach.

Functional unit 100 receives five input values, k, A, B, C, and Op. The input value k may be in the form of any known integer data type, and the input values A, B, and C may be in the form of any known floating point data types having a mantissa and an exponent. The input value Op may be any known data type that can indicate at least two logical states, and is used to determine whether functional unit 100 performs a multiply-add operation or a closest integer operation. When a multiply-add operation is specified, functional unit 100 generates the value of ($2^k$*A*B+C). When a closest integer operation is specified, functional unit 100 generates the integer that is closest to the value of ($2^k$*A*B).

Multiplexer 110 receives C, Op, and a hardwired floating point constant C1 in an unnormalized form. In this embodiment, in order to support the closest integer operation, the value of C1 is one-half, and the form of C1 depends on the value L. L is the number of bits allocated to represent the magnitude of the mantissa in the floating point format being used. The exponent of C1 is set to L−1, and the mantissa of C1 is set so that the value of C1 is one-half when the exponent is L−1. For example, in an embodiment where L is 24, as in a single precision floating point format, C1 is set to 0.00000000000000000000001*$2^{L-1}$. The output of multiplexer 110 is C2, where C2 is equal to C if Op specifies a fused multiply-add operation, and C2 is equal to C1 if Op specifies a closest integer operation.

Exponent unit 120 receives k, the exponent of A ("exp(A)"), the exponent of B ("exp(B)"), and the exponent of C2 ("exp(C2)"). Exponent unit 120 includes adder 121 to calculate the value of (k+exp(A)+exp(B)). Exponent unit 120 also includes comparator 122 to compare the value of (k+exp(A)+exp(B)) to the value of exp(C2). The greater of the two terms is the output E1 of exponent unit 120, along with an indicator of which term is greater and the difference between E1 and the other term.

Partial multiplier 130 receives the mantissa of A ("man(A)") and the mantissa of B ("man(B)"). Partial multiplier 130 calculates the partial products of (man(A)*man(B)).

Shifter 140 receives the partial products from partial multiplier 130, the mantissa of C2 ("man(C2)") from multiplexer 110, and the indicator and difference from exponent unit 120. If exp(C2) is the greater of the two terms compared by comparator 122, then shifter 140 shifts all of the partial products to the right, by the number of bits specified by the difference from exponent unit 120, so as to properly align them to C2. If exp(C2) is the lesser of the two terms, then shifter 140 shifts man(C2) to the right, by the number of bits specified by the difference from exponent unit 120, so as to properly align it to the partial products.

Adder 150 receives the partial products and the mantissa of C2, as each may have been shifted by shifter 140, and adds them together, generating the sum.

Mask unit 160 is enabled if Op specifies a closest integer operation. When enabled, mask unit 160 masks, or sets to zero, the bits of the sum from adder 150 that are below the binary point implied by E1, effectively truncating the sum so as to yield the closest integer to ($2^k$*A*B).

Normalizer 170 shifts the sum, as may have been masked by mask unit 160, and adjusts E1, as required to normalize the sum such that the most significant bit of the magnitude of the mantissa is nonzero. Normalizer 170 generates a normalized result of the specified operation, and may also generate a "sticky" bit, as known in the art of floating point arithmetic, which yields information about any bits eliminated in the normalization process.

Rounder 180 rounds the normalized result from normalizer 170, using the sticky bit if provided, and returns the result of the operation of functional unit 100, rounded and formatted in the floating point format according to which functional unit 100 is implemented. Alternatively or in addition, when closest integer is the specified function, the nonfractional portion of the sum, as truncated by mask unit 160 and before any shifting by normalizer 170, may be returned as the result in integer format.

Handling the sign of the data values may be implemented in any way that maybe used in a conventional fused multiply-adder. For example, the mantissas, the partial products, the sum of the partial products and C2, and the normalized sum may be expressed in two's complement format. To implement the closest integer operation, Op may be used to control the handling of the sign bit such that the signs of the mantissas of A and B are ignored when computing the partial products, but the exclusive-or of the signs is saved in order to restore the sign of the final result.

Figure 2:
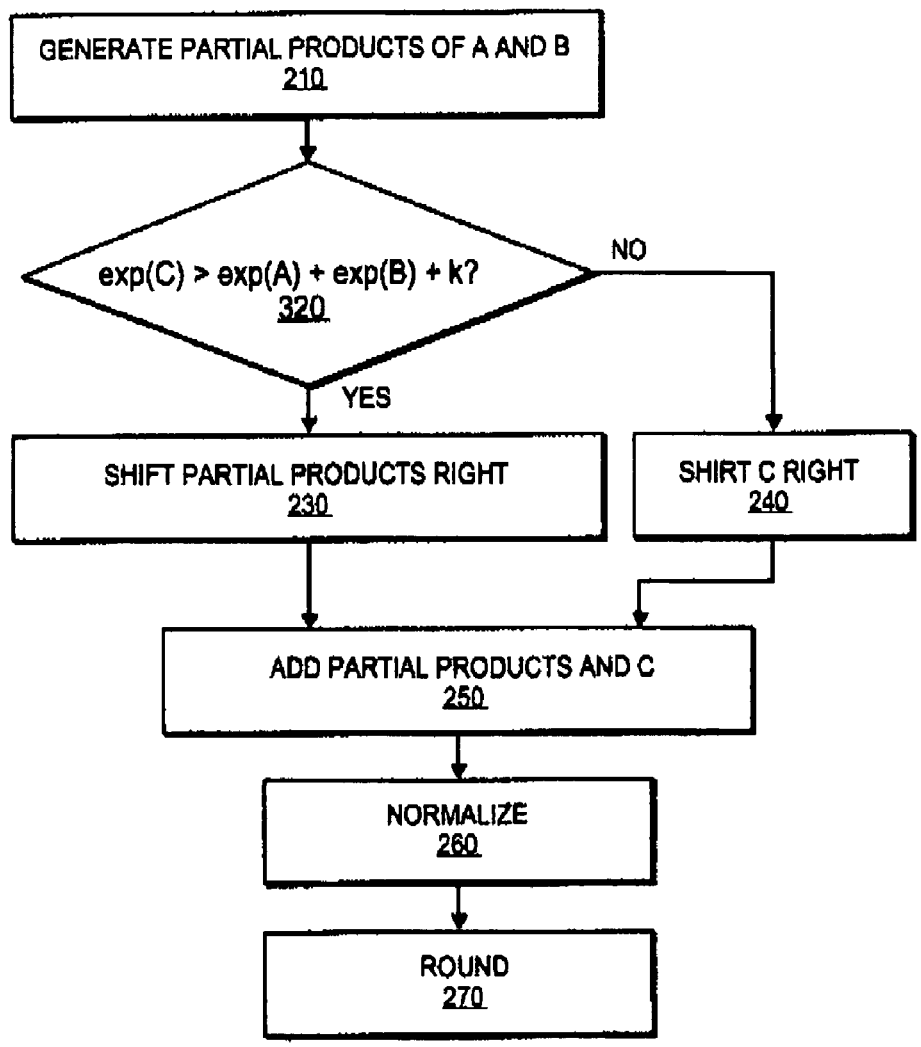
FIG. 2 illustrates an embodiment of a method for performing an enhanced fused multiply-add operation.

FIG. 2 is a flowchart illustrating an embodiment of a method for performing an enhanced fused multiply-add operation. In block 210, the partial products of the product of the mantissas of a floating point value A and a floating point value B are generated. In block 220, the value of the sum of an integer k, the exponent of A, and the exponent of B is compared to the value of the exponent of C. If the latter value is greater than the former value, then in block 230, the partial products are shifted to the right by the difference of the values. If the latter value is not greater than the former value, then in block 240, the mantissa of C is shifted to the right by the difference of the values. In block 250, the sum of the partial products and the mantissa of C is generated. In block 260, the sum from block 250 is normalized, and the exponent, corresponding to the greater of the two values compared in block 220, is adjusted based on the normalization of the sum. In block 270, the normalized result from block 260 is rounded and formatted according to the floating point format of A, B, and C, to yield the rounded value of $(2^{k}*A*B+C)$.

Figure 3:
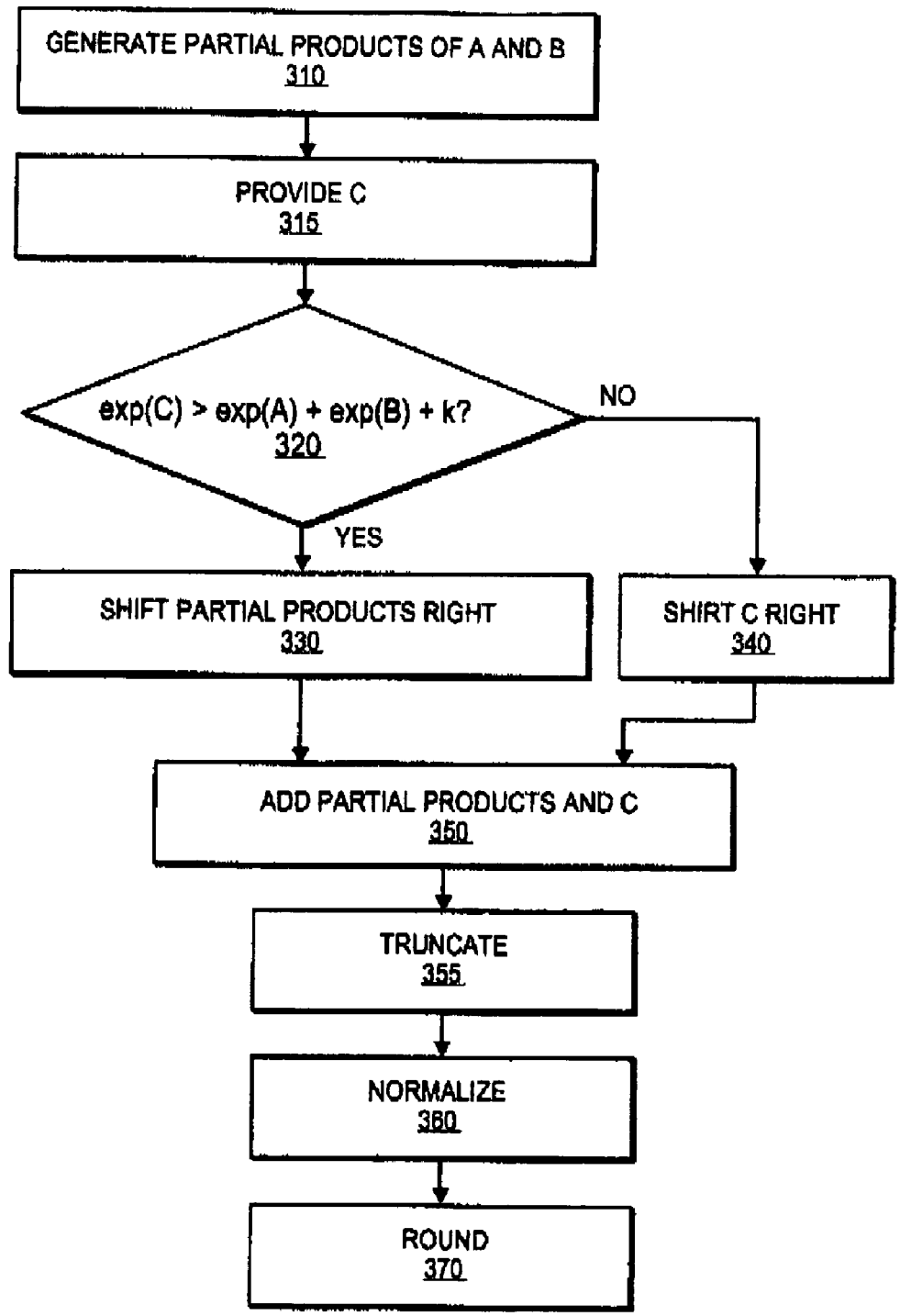
FIG. 3 illustrates another embodiment of a method for performing an enhanced fused multiply-add operation.

FIG. 3 is a flowchart illustrating another embodiment a method for performing an enhanced fused multiply-add operation. In block 310, the partial products of the mantissas of a floating point value A and a floating point value B are generated. In block 315, a constant C is provided, where the value of C is one-half, and C is formatted in the floating point format of A and B, such that the exponent of C equals L minus 1, where L is the number of bits allocated to represent the magnitude of the mantissa. In block 320, the value of the sum of an integer k, the exponent of A, and the exponent of B is compared to the value of the exponent of C. If the latter value is greater than the former value, then in block 330, the partial products are shifted to the right by the difference of the values. If the latter value is not greater than the former value, then in block 340, the mantissa of C is shifted to the right by the difference of the values. In block 350, the sum of the partial products and the mantissa of C is generated. In block 355, the sum from block 350 is truncated to yield the value of the closest integer to $(2^{k}*A*B)$. In block 360, the sum from block 355 is normalized, and the exponent, corresponding to the greater of the two values compared in block 320, is adjusted based on the normalization of the sum. In block 370, the normalized result from block 360 is rounded and formatted according to the floating point format of A, B, and C, to yield the value of the closest integer to $(2^{k}*A*B)$ in floating point format.

Figure 4:
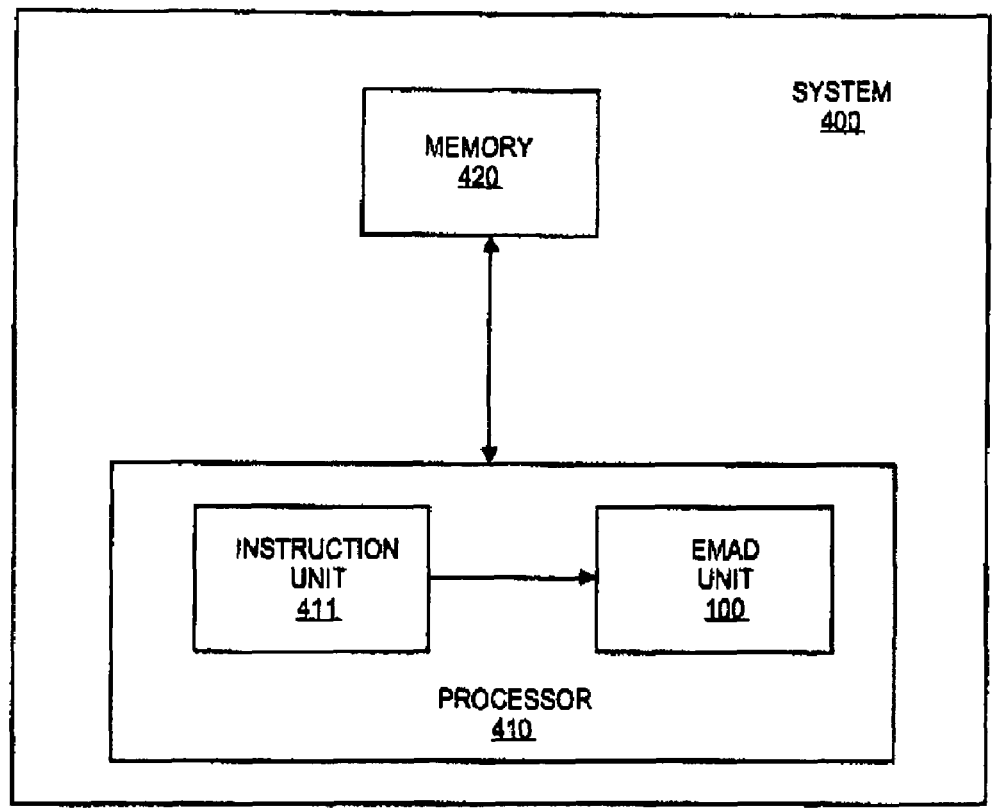
FIG. 4 illustrates an embodiment of a system for performing an enhanced fused multiply-add operation.

FIG. 4 illustrates an embodiment of a system 400 for performing a fused multiply-add instruction. System 400 includes processor 410 and memory 420. Processor 410 may be any of a variety of different types of processors that perform arithmetic operations on data. For example, the processor may be a general purpose processor such as a processor in the Pentium® Processor Family, the Itanium® Processor Family, or other processor family from Intel Corporation, or another processor from another company. Processor 410 includes functional unit 100, as described above, for performing an enhanced fused multiply-add operation.

Processor 410 also includes instruction unit 411 to issue the EMAD instruction. The EMAD instruction provides values for k, A, B, C, and Op. Instruction unit 411 generates control signals to control functional unit 100, such that functional unit generates the result of the EMAD operation responsive to a single instruction.

Processor 410 is coupled to memory 420. Memory 420 may be any type of memory capable of storing data to be operated on by processor 410, such as static or dynamic random access memory, semiconductor-based read only memory, or a magnetic or optical disk memory. Values for k, A, B, and C may be stored in memory 420 for access by processor 410 to perform an enhanced fused multiply-add operation.

Processor 410, or any other processor designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for performing an enhanced fused multiply-add instruction are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. For example, in the embodiment of FIG. 1, the mantissa of C1 may be set to zero to provide a truncate to integer function instead of a closest integer function. In another embodiment, prior to truncation, normalization, and rounding, the bits higher than the implied binary point may be extracted to yield a first integer value, and the bits lower than the implied binary point may be extracted to yield a second integer value. The first and second integer values may then be used as indices in a table lookup function.

In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
    an exponent unit including:
        a first adder to generate S1, where S1 is the sum of an integer k, the exponent of a floating point value A, and the exponent of a floating point value B;
        a comparator to generate E1, where E1 is the greater of S1 and the exponent of a floating point value C;
    a partial multiplier to generate partial products of the mantissas of A and B;
    a shifter to align the partial products and the mantissa of C, based on E1; and
    a second adder to add the aligned partial products and the mantissa of C.

2. The apparatus of claim 1 further comprising a multiplexer to set C to a constant in response to a control signal.

3. The apparatus of claim 2 wherein the multiplexer is also to set the exponent of C to L minus 1, where L is based on a number of mantissa bits in the floating point format of C.

4. The apparatus of claim 1 further comprising an instruction unit to issue an instruction that provides values of k, A, B, and C, and controls the exponent unit, the partial multiplier, the shifter, and the adder.

5. An apparatus comprising:
    an exponent unit including:
        a first adder to generate S1, where S1 is the sum of at least the exponent of a floating point value A and the exponent of a floating point value B;
        a comparator to generate E1, where E1 is the greater of S1 and the exponent of a floating point value C;
    a multiplexer to set C to a constant in response to a control signal;
    a partial multiplier to generate partial products of the mantissas of A and B;
    a shifter to align the partial products and the mantissa of C, based on E1; and
    a second adder to generate S2, where S2 is the sum of the aligned partial products and the mantissa of C.

6. The apparatus of claim 5 wherein the constant equals one-half.

7. The apparatus of claim 5 wherein the multiplexer is also to set the exponent of C to L minus 1, where L is based on a number of mantissa bits in the floating point format of C.

8. The apparatus of claim 5 further comprising a mask unit to truncate S2.

9. The apparatus of claim 5 further comprising an instruction unit to issue an instruction that provides values of A, B, C, and the control signal, and controls the exponent unit, the multiplexer, the partial multiplier, the shifter, and the adder.

10. A system comprising:
    a memory; and
    a processor coupled to the memory, having:
        an exponent unit including:
            a first adder to generate S1, where S1 is the sum of an integer k, the exponent of a floating point value A, and the exponent of a floating point value B;
            a comparator to generate E1, where E1 is the greater of S1 and the exponent of a floating point value C;
        a partial multiplier to generate partial products of the mantissas of A and B;
        a shifter to align the partial products and the mantissa of C, based on E1; and
        a second adder to add the aligned partial products and the mantissa of C.

11. A system comprising:
    a memory; and
    a processor coupled to the memory, having:
        an exponent unit including:
            a first adder to generate S1, where S1 is the sum of at least the exponent of a floating point value A, and the exponent of a floating point value B;
            a comparator to generate E1, where E1 is the greater of S1 and the exponent of a floating point value C;
        a multiplexer to set C to a constant in response to a control signal;
        a partial multiplier to generate partial products of the mantissas of A and B;
        a shifter to align the partial products and the mantissa of C, based on E1; and
        a second adder to generate S2, where S2 is the sum of the aligned partial products and the mantissa of C.

12. The system of claim 11 wherein the multiplexer is also to set the exponent of C to L minus 1, where L is based on a number of mantissa bits in the floating point format of C.

13. The system of claim 11 wherein the processor further comprises a mask unit to truncate S2.

* * * * *